Feb. 20, 1968 G. H. REED 3,370,131

MULTI-TRACK MAGNETIC HEAD MOVING APPARATUS

Filed Dec. 28, 1964 2 Sheets-Sheet 1

INVENTOR
Gordon H. Reed
BY
Watson, Cole, Grindle & Watson
ATTORNEYS

INVENTOR
BY Gordon H. Reed
Watson, Cole, Grindle & Watson
ATTORNEYS 3,370,131
MULTI-TRACK MAGNETIC HEAD MOVING APPARATUS
Gordon Howard Reed, Jersey, Channel Islands, England, assignor to Television Research Limited
Filed Dec. 28, 1964, Ser. No. 421,205
Claims priority, application Great Britain, Dec. 31, 1963, 51,270/63
5 Claims. (Cl. 179—100.2)

ABSTRACT OF THE DISCLOSURE

This invention provides automatic track-changing apparatus for moving a magnetic head in a transverse direction with respect to a multi-track tape. Activation of an electro-motive device causes a cam member having a sleeve member mounted with a plurality of angularly spaced cavities to engage a biased pin at predetermined angular positions of the cam member to align the magnetic head to associated tape tracks. The magnetic head is mounted by a parallel linkage such that the tape contacting face of the head remains substantially parallel to the plane of the tape throughout its range of movement.

Figure 1:
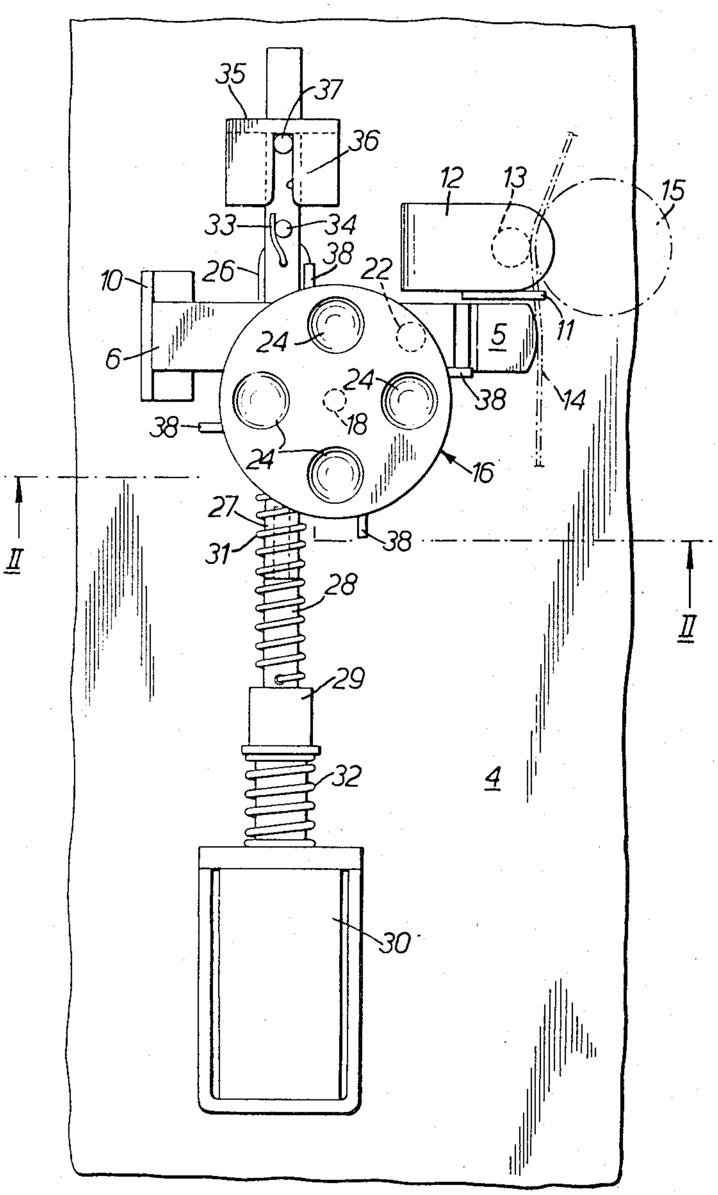

This invention is concerned with multi-track magnetic tape record apparatus, including apparatus of this kind in which a cassette or other box-like housing accommodates such a magnetic record tape and is adapted to be retained, in a temporary manner, in association with the remainder of the apparatus.

An object of the invention is to provide such multi-track apparatus which has facilities for automatic track changing and enables this automatic action to be overruled in order to obtain manual changeover from one track to any other.

According to the invention a magnetic record apparatus of the multi-track tape type and wherein track-changing is effected by moving a magnetic head transversely of the tape, is characterised in that said apparatus comprises a rotatable cam member which, upon being rotated, causes the magnetic head of the apparatus to be moved transversely of the magnetic record tape for the purpose of track-changing, an electro-motive device, a toothed rack and pinion mechanism arranged between said cam member and said electro-motive device in a manner such that appropriate energisation of this device results in the cam member having rotary movement imparted thereto to bring it from a predetermined angular position which corresponds to the alignment of the head with one track of the tape to another angular position which corresponds to the alignment of the head with another track of the tape, and registering means which retain the cam member temporarily in each of the said predetermined positions.

In preferred embodiments of the invention the electro-motive device is a solenoid and the plunger element of this is coupled mechanically with the rack of the rack and pinion mechanism. A stop means is provided to limit the rapid rotary movement of the cam member which results from the energisation of this solenoid so that, for each period of such energisation, the cam member has imparted thereto a rotary movement the angular extent of which is appropriate to move the head from one track on the tape to an immediately adjacent track on the tape.

According to a feature of the invention the cam member is arranged to be rotatable independently of the operation of the electro-motive device and means can be provided which facilitate such independent rotation of the cam member by hand. For example, a rotatable member upon which the cam is forced or carried or is otherwise arranged to turn with the cam is provided with a hole or recess with which a finger of a hand can be engaged and used to rotate the cam independently of the rack and pinion mechanism.

In one preferred embodiment of the invention a magnetic play-back head is anchored to a support therefor through the intermediary of a parallel linkage such that the head remains substantially parallel with the plane of the tape throughout the range of movement of the head transversely of the tape. This parallel linkage comprises a pair of spaced apart limbs at least one of which is formed from highly resilient strip material, for example phosphor bronze. Adjacent ends of these limbs are fixed to a supporting platform of the apparatus and the head is mounted upon a carriage which is fixed between the adjacent opposite ends of these limbs. The inherent resilience of this parallel linkage is used to cause the head to follow the contour of the track-changing cam which determines the position of the head transversely of the tape.

Figure 2:
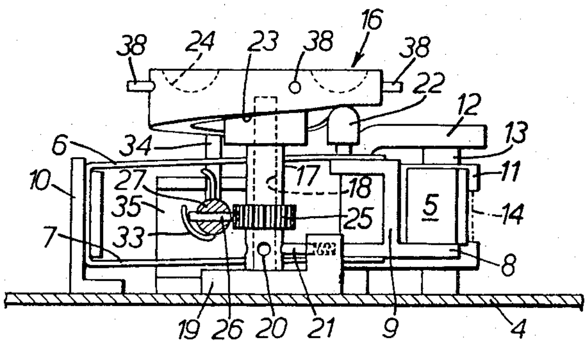
Figure 3:
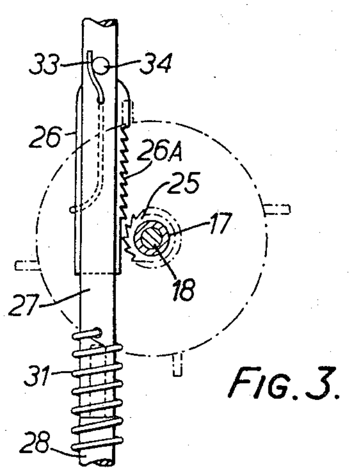

In order that the invention can be understood more easily a preferred embodiment thereof will now be described by way of example with reference to the accompanying drawings, wherein:

FIG. 1 is a plan view of a portion of a magnetic record play-back apparatus constructed and arranged according to the invention, FIG. 2 is a sectional elevation taken on the line II—II of FIG. 1, and FIG. 3 is a plan view of a detail of the mechanism shown in FIGS. 1 and 2.

In this embodiment of the invention a platform 4 of the apparatus serves as a general support for mechanism which includes a magnetic play-back head 5. This head is anchored to platform 4 through the intermediary of a parallel linkage which comprises a pair of spaced apart limbs 6 and 7, each formed from highly resilient strip material such for example as phosphor bronze. The head is attached to a front extension 8 of a carriage 9 to upper and lower rear extensions of which an outer end of a separate limb of the parallel linkage is attached. The inner ends of these limbs are anchored to a bracket 10 which extends upwardly from the platform 4. A tape guide 11 is provided alongside one edge of the head and extends forwardly from a bracket 12 which carries a bearing for a tape-driving capstan 13. This capstan is arranged to be driven by an electric motor (not shown) for the purpose of moving a magnetic record tape with respect to the head. A portion of such a tape is indicated in dotted lines at 14 and this portion may for example be a loop which extends from an endless roll of tape accommodated in known manner in a cassette which is adapted to be attached to the apparatus. The tape is located by the guide 11 and is held in driving contact with the capstan 13 by a pressure roller which forms a part of the cassette and is indicated in dotted lines at 15.

This embodiment of the invention is adapted to use four-track tape and accordingly provision is made for the head 5 to be moved transversely of the tape into any one of four predetermined different positions, each of which corresponds to the position of a separate track upon the tape. For the purpose of obtaining such transverse movement of the head there is provided a rotatable cam member 16 which is carried by a sleeve 17 mounted to rotate upon a stub axle 18. The latter extends upwardly from a supporting block 19 which is itself fixed to the platform 4 of the apparatus. The lower end of the sleeve 17 is provided with four equally spaced cavities (one of which is indicated at 20) with each of which in turn, there is adapted to engage a spring influenced pin 21, the latter being mounted in the block 19. This pin 21 and each of the cooperating cavities, such as 20, constitutes a set of registering means which serves to retain the cam member 16 temporarily in each of four predetermined angular positions which are spaced 90° apart and each of which corresponds to a different track of the tape. The carriage 9 of the parallel linkage system is provided with a fibre or other suitable member 22 which is adapted to function as a cam-follower in respect of a track-changing cam 23 which is provided on the underside of the cam member 16, this follower being held in contact with this cam by reason of the resilience of the limbs 6 and 7 of the parallel linkage. The amplitude of the cam 23 is such that for the extreme upper position of the follower 22 (as shown in FIG. 2) the head 5 is in the position which corresponds to the use of the uppermost track of the tape 14 and, for the other extreme position of the follower 22, the position of the head corresponds to the use of the lowermost track of the tape.

The upper face of the cam member 16 is provided with recesses 24 which provide accommodation for a finger tip to facilitate manual rotation of this cam member in order to effect a manual change-over from one track to another, the arrangement being such that for each 90° movement of the cam member 16 the head 5 is moved into alignment with another track of the tape. The cam 23 is a continuous one so that after progressive movements of the head from the first (uppermost) track to the second, to the third and then to the fourth (lowermost) track, the next 90° movement of the cam member will allow the head to return, under the action of the resilient limbs of the parallel linkage, directly to the uppermost position which corresponds to the first track. The correct angular positioning of the rotary cam member for each of its four different positions is determined by the registering means which comprises the spring influenced pin 21 and each in turn of the four cavities 20. The provision of the parallel linkage for supporting the head 5 ensures that the tape-contacting face of the latter remains in substantially parallel planes throughout the range of movement of the head transversely of the tape.

Near the lower end of the sleeve 17 there is provided a pinion wheel 25 which forms one element of a toothed rack and pinion mechanism of the one-way type, the rack of which is indicated at 26 and is accommodated in a slot provided in a rod 27. One end of this rod 27 is bored to accommodate, in sliding manner, the coaxial outer end portion of a rod 28 which extends from a plunger 29 of a solenoid 30. The other end of the rod 27 is mounted to slide in a bearing plate 35 and an extension of this bearing plate is provided with a slot 36 which accommodates a pin 37 which extends from the rod 27 and prevents rotation of the latter whilst permitting it to slide in the bearing plate. A tension spring 31 is arranged to provide a resilient coupling between the rods 27 and 28 so that, upon the solenoid being suitably energised, the plunger thereof is able to respond more satisfactorily by being able to move to some extent independently of the rod 27, the follow-up movement of the latter being assured by the action of the spring 31. A compression spring 32 tends to return the plunger to its normal position. The rack 26 comprises a strip of metal which is provided with appropriate teeth 26A along a portion of one of its edges for engagement with the cooperating teeth of the pinion 25. This rack is pivoted to the rod 27 near that end of the slot therein which is more remote from the solenoid and conveniently this pivotal connection is made by a wire 33 which also acts as a limb spring to hold the rack against the pinion 25. One end of this wire 33 engages with the edge of the rack and the other end abuts a pin 34 which extends upwardly from the rod 27, this pin also having another function to perform as will be described hereinafter. The periphery of the cam member 16 is provided with four outwardly extending and equally spaced apart pins 38 which ensure that the angular movement of the cam member for any one given period of energisation of the solenoid 30 does not extend beyond the desired 90°. Thus, when the solenoid 30 is suitably energised, the resulting movement of the rod 27 causes the teeth 32 of the rack 26 to engage with the teeth of the pinion wheel 25 and results in rapid rotary movement of the cam member 16. This rapid movement is arrested, independently of the travel of the plunger 29 of the solenoid, because the pin 34 which projects upwardly from the rod 27 comes into the path of the next oncoming pin 38. For this position of the cam member 16, that is to say with one of the arresting pins 38 closely adjacent the stop pin 34, the registering means consisting of the spring influenced pin 21 engages with one of the four cavities 20 to retain the cam member in this position when, at the end of the energisation of the solenoid 30, the plunger 29 is returned to its normal position by the action of spring 32 and causes the likewise return of the rods 27 and 28 and the rack 26. During such return movement, the rack is displaced about its pivotal connection with the rod 22 and against the action of the spring wire 33 as the teeth 26A slip over the teeth of the pinion 25, no drive being imparted to the pinion during this return movement. It will be seen that the required transverse movement of the magnetic head with respect to the tape for the purpose of track changing can be effected either by manual operation of the cam member 16 or by suitable energisation of the solenoid 30 and that moreover such manual operation can be effected independently of the rack and pinion mechanism and the energisation of said solenoid.

It is to be understood that, merely for simplification, the accompanying drawings do not show the electrical leads pertaining to the magnetic head 5 and the solenoid 30.

The energisation of the solenoid can be controlled in any desired suitable manner but in preferred embodiments this energisation is adapted to take place automatically at the termination of a recording in any particular track. This can be effected in well known manner by providing a conductive surface in an appropriate position on the tape or more conveniently by providing means, for detecting the absence of recording for longer than a predetermined time. Alternatively the arrangement can comprise means for detecting a particularly characteristic recording, for example the presence of a sustained subaudible tone recorded at the end of a track. Electronic amplifier means, for example a transistor amplifier, and associated electrical elements of such a detection arrangement can be mounted in association with the platform 4 of the apparatus.

What I claim is:

1. A magnetic record apparatus of the multi-track type wherein track-changing is effected by moving a magnetic head transversely of the tape, in combination, comprising:
- a rotatable cam member for transversely moving the magnetic head,
- an electromotive device,
- a rack and pinion member mounted between the cam member and the electromotive device for imparting a rotary movement to the cam upon energization of the electromotive device to bring the cam member from a predetermined angular position corresponding to the alignment of the head with one track of the tape to another predetermined angular position corresponding to the alignment of the head with another track of the tape,
- registering means for retaining the cam member temporarily in each of the predetermined positions,
- a sleeve member mounted to rotate with the cam member,
- the sleeve member including a plurality of angularly spaced cavities, and
- a pin biased to engage the cavities corresponding to a predetermined position of the cam member.

2. A magnetic record apparatus of the multi-track type wherein track-changing is effected by moving a magnetic head transversely of the tape, in combination, comprising:

a rotatable cam member for transversely moving the magnetic head, an electromotive device, a rack and pinion member mounted between the cam member and the electromotive device for imparting a rotary movement to the cam upon energization of the electromotive device to bring the cam member from a predetermined angular position corresponding to the alignment of the head with one track of the tape to another predetermined angular position corresponding to the alignment of the head with another track of the tape, registering means for retaining the cam member temporarily in each of the predetermined positions, a platform, a rod mounted to slide with respect to the platform, a solenoid for imparting forward movement to the rod, spring means for imparting return movement to the rod, means serving to pivot the rack and pinion member to engage the rod, and a pinion rotatable with respect to the cam member and arranged to engage the rack, the rack and pinion including teeth means which are engaged such that for one direction of movement of rod the rack teeth engage the pinion teeth and rotate the latter, and for the other direction of movement of the rod the rack pivots with respect to the rod to allow the teeth of the rack to slip over the pinion teeth without causing rotation of the latter.

3. A magnetic record apparatus as claimed in claim 2 wherein the solenoid includes a plunger coupled to the rod by spring means such that upon energization of the solenoid the spring means permit the plunger to move independently of the rod and wherein the spring means exert a follow-up movement on the rod.

4. A magnetic record apparatus as claimed in claim 2 wherein the rod includes a projecting pin for arresting rotation of the cam member resulting from the energization of the solenoid.

5. A magnetic record apparatus according to claim 4 wherein the magnetic head is mounted to the platform of the apparatus by means of a parallel linkage such that the tape-contacting face of the head remains in substantially parallel planes throughout the range of movement of the head transversely of the tape.

References Cited

UNITED STATES PATENTS

| | | | |
|---|---|---|---|
| 3,124,789 | 3/1964 | Wasylenko -------- | 340—174.1 |
| 2,898,113 | 8/1959 | Namenyi et al. ---- | 179—100.2 |

BERNARD KONICK, *Primary Examiner.*

TERRELL W. FEARS, *Examiner.*

A. I. NEUSTADT, *Assistant Examiner.*